(12) United States Patent
Ku

(10) Patent No.: US 8,381,349 B2
(45) Date of Patent: Feb. 26, 2013

(54) WINDSHIELD WIPER BLADE ASSEMBLY

(75) Inventor: Yuan-Chin Ku, New Taipei (TW)

(73) Assignee: Dongguan Hongyi Wiper Co., Ltd. (CN)

( * ) Notice: Subject to any disclaimer, the term of this patent is extended or adjusted under 35 U.S.C. 154(b) by 188 days.

(21) Appl. No.: 13/076,992

(22) Filed: Mar. 31, 2011

(65) Prior Publication Data
US 2012/0180247 A1    Jul. 19, 2012

(30) Foreign Application Priority Data

Jan. 14, 2011   (CN) .......................... 2011 1 0007239

(51) Int. Cl.
B60S 1/40    (2006.01)
(52) U.S. Cl. ................ 15/250.32; 15/250.43; 15/250.44; 15/250.361
(58) Field of Classification Search ............... 15/250.32, 15/250.43, 250.44, 250.361, 250.31, 250.201
See application file for complete search history.

(56) References Cited

U.S. PATENT DOCUMENTS

| | | | | |
|---|---|---|---|---|
| 4,180,885 A * | 1/1980 | Thornton et al. | .......... | 15/250.32 |
| 4,324,019 A * | 4/1982 | Mohnach et al. | .......... | 15/250.32 |
| 5,383,248 A * | 1/1995 | Ho | .............. | 15/250.32 |
| 5,715,563 A * | 2/1998 | Marks | ........... | 15/250.32 |
| 2012/0180245 A1* | 7/2012 | Ku | .............. | 15/250.32 |
| 2012/0180248 A1* | 7/2012 | Depondt | .................. | 15/250.32 |

FOREIGN PATENT DOCUMENTS

EP    0459867    * 12/1991

* cited by examiner

Primary Examiner — Gary Graham
(74) Attorney, Agent, or Firm — Banner & Witcoff, Ltd.

(57) ABSTRACT

A windshield wiper blade assembly comprises: a middle housing having a middle frame segment that defines an accommodating recess; an elastic wiper blade; and a bridging member fitted in the accommodating recess. The bridging member has two end parts, a middle part and a pivot part. The pivot part protrudes upwardly from a top wall of the middle part. Each of the end parts has a top edge extending upwardly from the top wall so as to cooperate with the pivot part to define an extension recess. At least one of the end parts engages the middle frame segment in a tongue-and-groove engaging manner and at least one of the end, parts and the middle part engages the middle frame segment in a snap-fit engaging manner.

11 Claims, 16 Drawing Sheets

WINDSHIELD WIPER BLADE ASSEMBLY

CROSS-REFERENCE TO RELATED APPLICATION

This application claims priority of Chinese Application No. 201110007239.8, filed on Jan. 14, 2011.

BACKGROUND OF THE INVENTION

1. Field of the Invention

This invention relates to a windshield wiper blade assembly, more particular to a windshield wiper blade assembly including a middle housing and a bridging member fitted in and engaging the middle housing.

2. Description of the Related Art

A conventional vehicle windshield wiper includes an elongate elastic blade, an elongate blade support for supporting the elastic blade thereon, a bridging member secured to the blade support, a wiper arm pivoted to the bridging member, and a motor for driving movement of the wiper arm together with the elastic blade.

There is a need to design an assembly of the blade support and the bridging member that has a height relative to the elastic blade as low as possible so as to reduce the wind resistance thereof and that is easy to assemble and disassemble the bridging member and the blade support.

SUMMARY OF THE INVENTION

Therefore, an object of the present invention is to provide a windshield wiper blade assembly that can meet the foresaid needs of reducing the height of the assembly of the blade support and the bridging member and of easy assembly and disassembly of the bridging member and the blade support.

According to the present invention, there is provided a windshield wiper blade assembly that is adapted to be connected to a wiper arm connector having a pivot shaft and that comprises: an elongate middle housing having a middle frame segment that defines an accommodating recess; an elastic wiper blade having a top end secured to a bottom side of the middle housing; and a bridging member fitted in the accommodating recess. The bridging member has two end parts, a middle part disposed between and interconnecting the end parts, and a pivot part. The middle part has a top wall and two opposite side walls extending downwardly and respectively from two opposite sides of the top wall into the accommodating recess. The pivot part protrudes upwardly from the top wall of the middle part and defines a shaft-receiving recess for extension of the pivot shaft of the wiper arm connector therein. Each of the end parts has a top edge extending upwardly and outwardly from an adjacent end of the top wall of the middle part so as to cooperate with the pivot part to define an extension recess therebetween for extension of an adjacent one of two ends of the wiper arm connector therein during swinging of the wiper arm connector about an axis of the pivot shaft. At least one of the end parts engages the middle frame segment of the middle housing in a tongue-and-groove engaging manner and at least one of the end parts and the middle part engages the middle frame segment of the middle housing in a snap-fit engaging manner.

BRIEF DESCRIPTION OF THE DRAWINGS

In drawings which illustrate five embodiments of the invention.

DETAILED DESCRIPTION OF THE PREFERRED EMBODIMENTS

Figure 1:
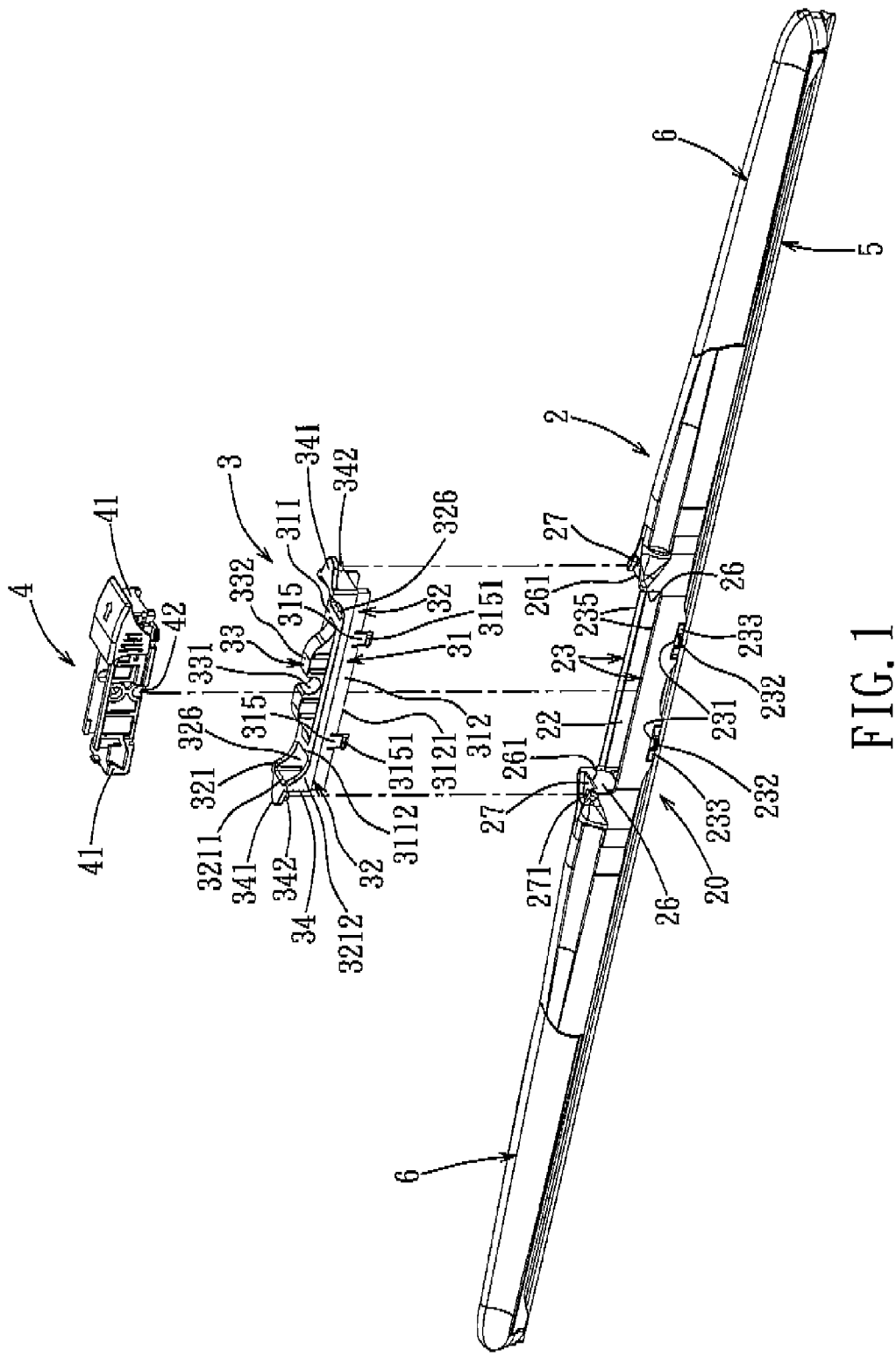
FIG. 1 is a partly exploded perspective view of the first preferred embodiment of a windshield wiper blade assembly according to the present invention, with a wiper arm connector to be connected thereto.
Figure 2:
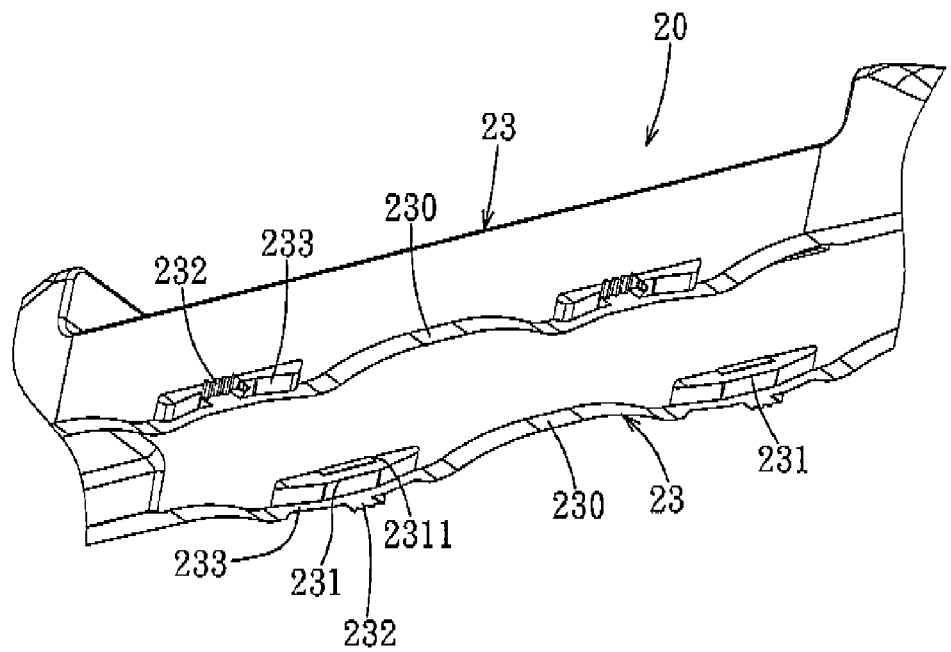
FIG. 2 is fragmentary perspective view of a middle frame segment of a middle housing of the first preferred embodiment, viewing from a bottom side.
Figure 3:
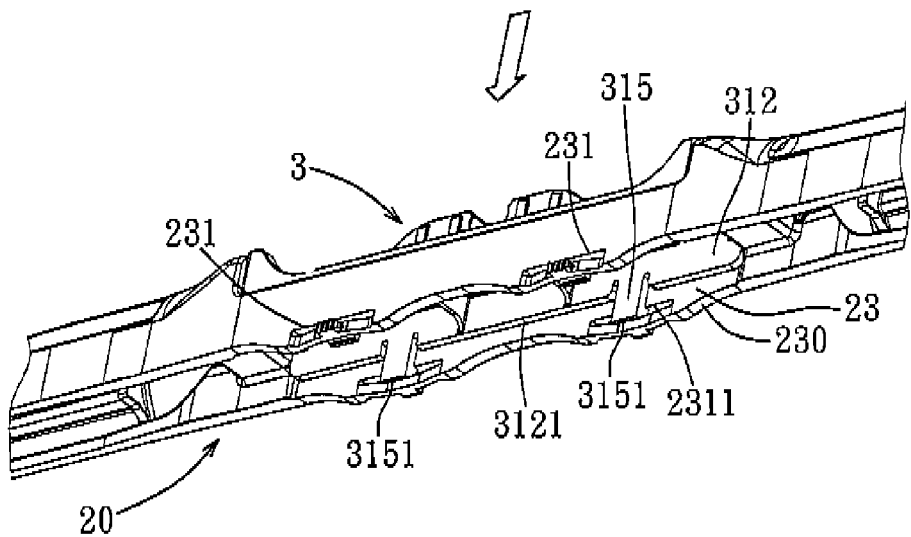
FIG. 3 is a fragmentary assembled perspective view of the first preferred embodiment.
Figure 4:
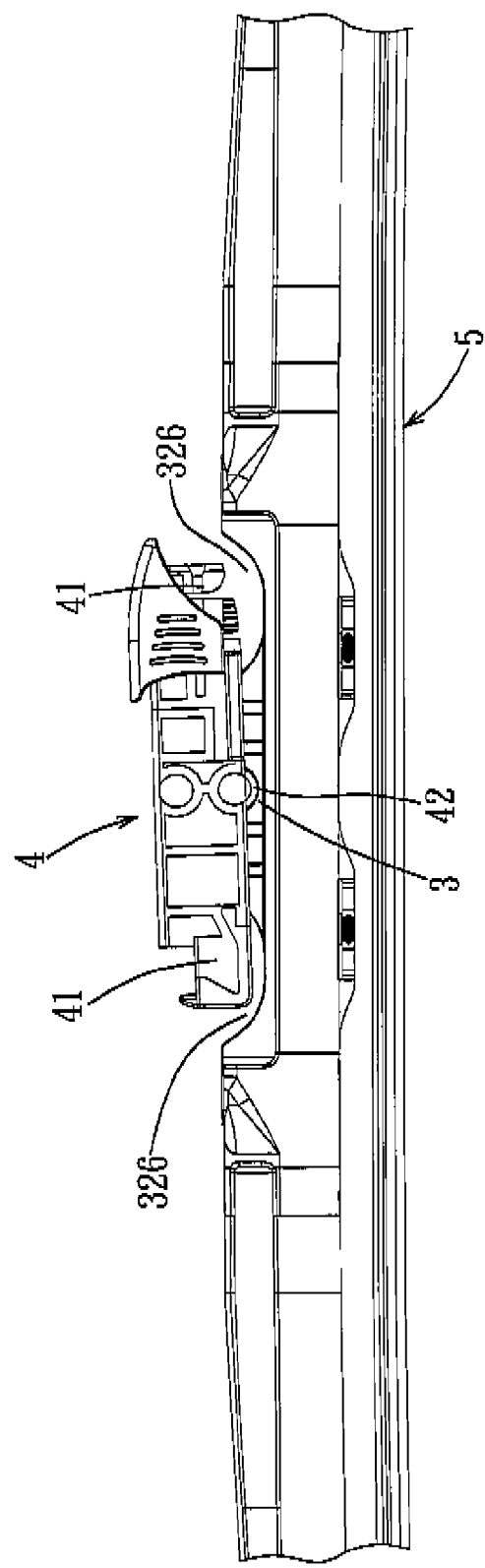
FIG. 4 is a fragmentary side view of the first preferred embodiment, with the wiper arm connector mounted thereon.
Figure 5:
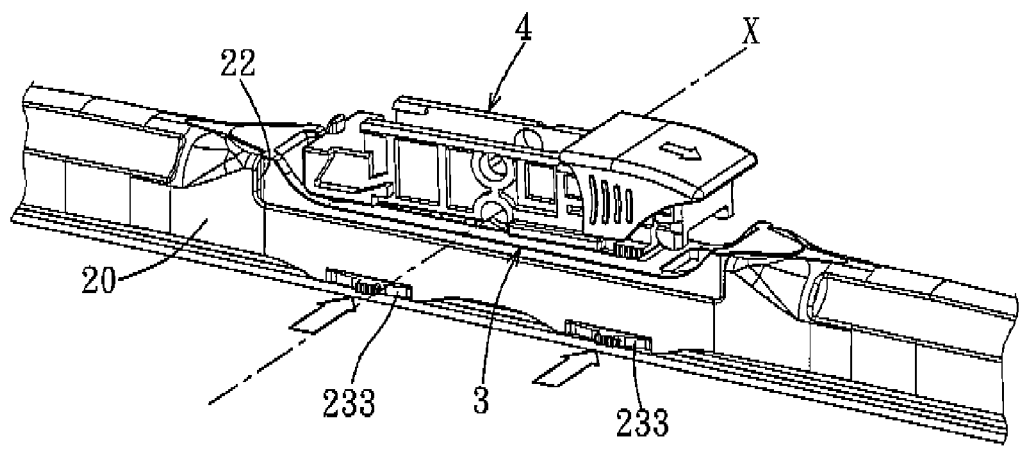
FIG. 5 is a fragmentary perspective view illustrating how a bridging member is detached from the middle housing of the first preferred embodiment.
Figure 6:
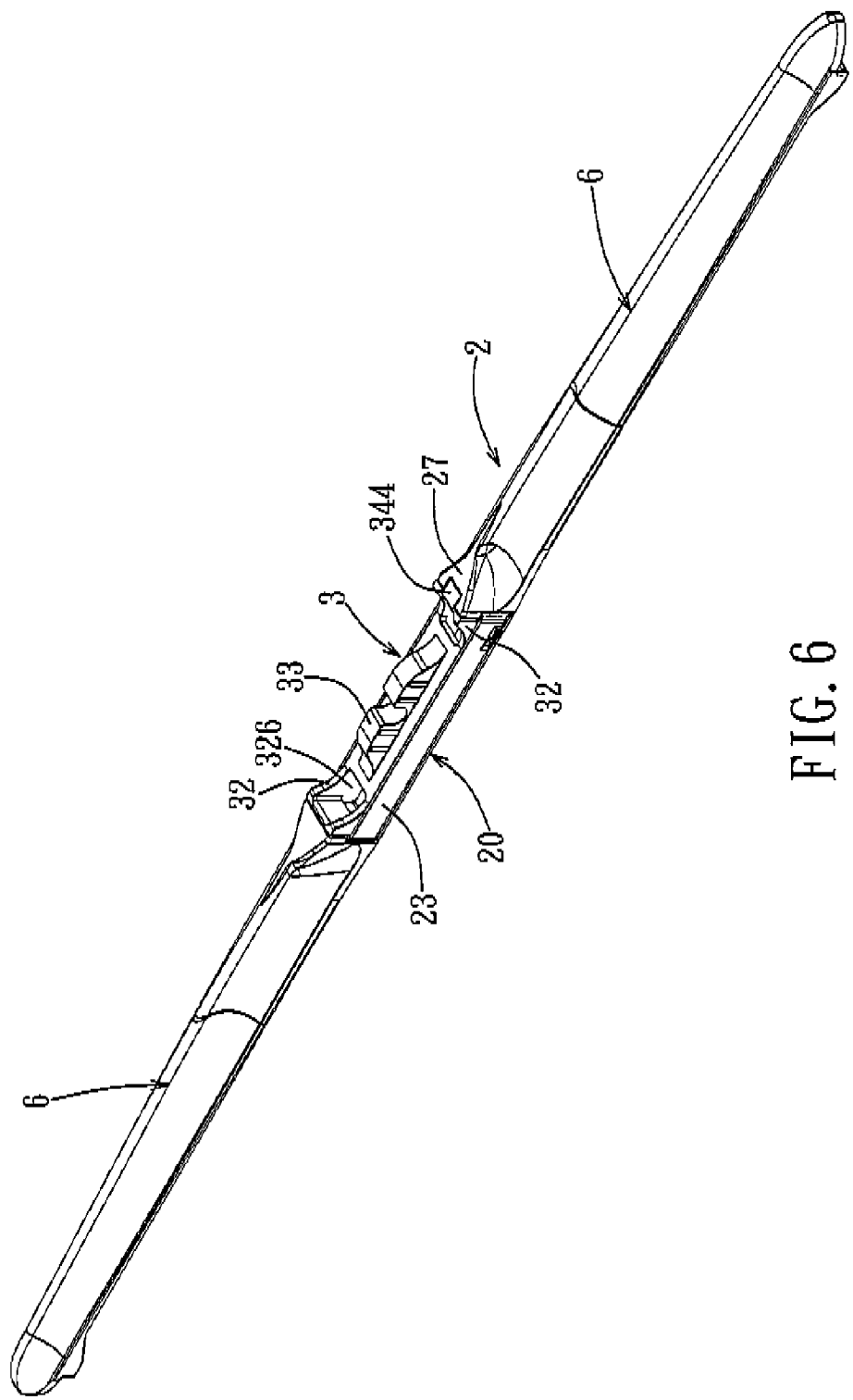
FIG. 6 is a perspective view of the second preferred embodiment of a windshield wiper blade assembly according to the present invention.
Figure 7:
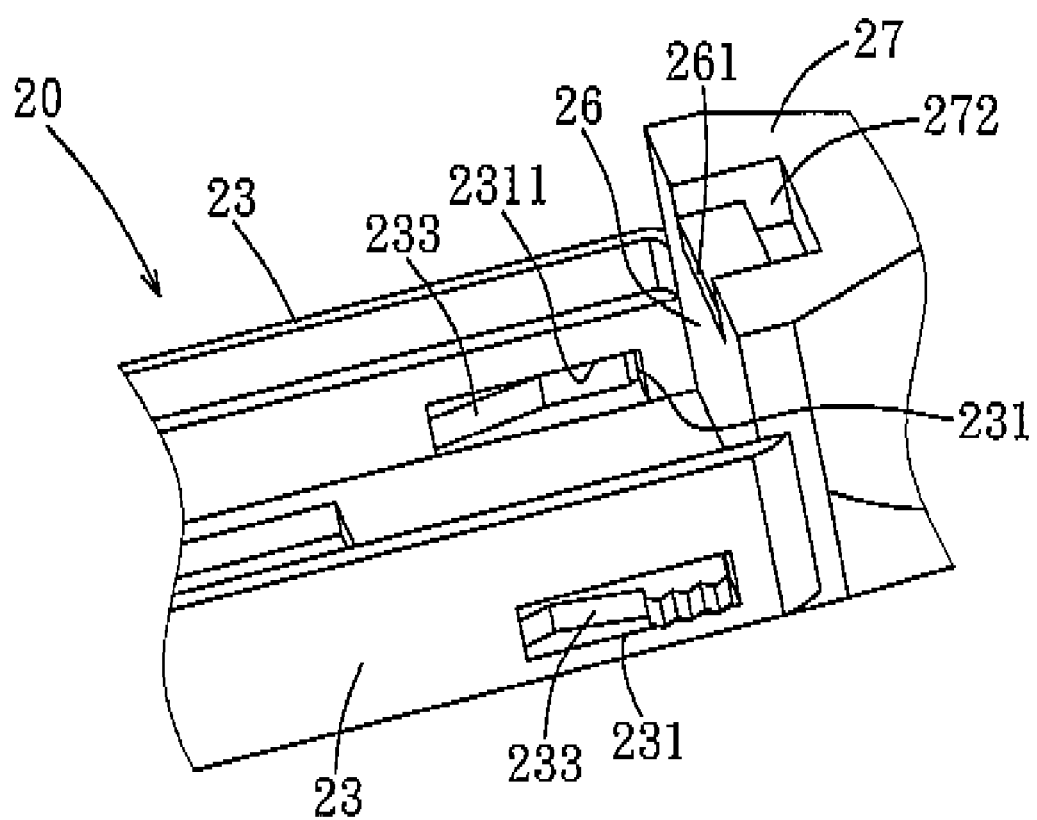
FIG. 7 is a fragmentary perspective view of a middle frame segment of a middle housing of the second preferred embodiment, viewing from a top side.

Before the present invention is described in greater detail with reference to the accompanying preferred embodiments, it should be noted herein that like elements are denoted by the same reference numerals throughout the disclosure.

FIGS. 1 to 5 illustrate the first preferred embodiment of a windshield wiper blade assembly according to the present invention. The windshield wiper blade assembly is adapted to be connected to a wiper arm connector 4, which is adapted to be connected to a wiper arm (not shown), and includes an elongate elastic wiper blade 5, two elongate side housings 6, an elongate middle housing 2, and abridging member 3. The wiper arm together with the wiper blade assembly is driven by a wiper motor (not shown) so as to permit the wiper blade 2 to wipe a windshield glass surface (not shown).

The side housings 6 and the middle housing 2 are made from plastics and are formed by molding techniques. The wiper blade 5 has a top end secured to bottom sides of the side housings 6 and the middle housing 2 through clamping means (not shown).

The middle housing 2 has a middle frame segment 20 (see FIG. 2) that defines an accommodating recess 22. The accommodating recess 22 is defined by a recess-defining wall that has two first wall portions 26 and two second wall portions 23. The first wall portions 26 are spaced apart from and opposite to each other along a length of the middle housing 2. The second wall portions 23 are connected between and the first wall portions 26. Each of the second wall portions 23 has a bottom end 230, and is formed with two slots 231 adjacent to the bottom end 230, and two flexible bars 233 disposed immediately under the slots 231, respectively. Each of the flexible bars 233 is formed with a button protrusion 232 for facilitating a pressing operation of each of the flexible bars 233, and defines a bottom side of the corresponding slot 231. Each of the slots 231 has a top side that is defined by a slot-defining wall 2311. The middle frame segment 20 has two opposite first wings 27 extending respectively from top ends 261 of the first wall portions 26 along the length of the middle housing 2 in opposite directions. Each of the first wings 27 is formed with an engaging groove 271.

The bridging member 3 is fitted in the accommodating recess 22, and has two end parts 32, a middle part 31 disposed between and interconnecting the end parts 32, and a pivot part 33. The middle part 31 has a top wall 311 and two opposite side walls 312 extending downwardly and respectively from two opposite sides of the top wall 311 into the accommodating recess 22. The pivot part 33 protrudes upwardly from the top wall 311 of the middle part 31 and defines a shaft-receiving recess 331 for extension of a pivot shaft 42 of the wiper arm connector 4 therein. Each of the end parts 32 has a generally U-shaped top edge 321 having an uppermost edge portion 3211, and a curved intermediate edge portion 3212 extending upwardly and outwardly from an adjacent end 3112 of the top wall 311 of the middle part 31 to the uppermost edge portion 3211 so as to cooperate with the pivot part 33 to define an extension recess 326 therebetween for extension of an adjacent one of two ends 41 of the wiper arm connector 4 therein during swinging of the wiper arm connector 4 about an axis of the pivot shaft 42. The end parts 32 engage the middle frame segment 20 of the middle housing 2 in a tongue-and-groove engaging manner and the middle part 31 engages the middle frame segment 20 of the middle housing 2 in a snap-fit engaging manner.

The bridging member 3 further has two opposite second wings 341 extending respectively from the uppermost edge portions 3211 of the U-shaped top edges 321 of the end parts 32 in opposite directions along the length of the middle housing 2. Each of the second wings 341 is formed with a cylindrical engaging tongue 342 protruding downwardly therefrom and fitted into the engaging groove 271 in a respective one of the first wings 27. Each of the side walls 312 of the middle part 31 of the bridging member 3 has a bottom end 3121 and is formed with two flexible legs 315 that extends downwardly from the bottom end 3121 of the side wall 312 of the middle part 31 and that has a hooked end 3151 which extends into the corresponding slot 231 to engage releasably the slot-defining wall 2311 of a respective one of the second wall portions 23 of the recess-defining wall defining the accommodating recess 22 in a snap-fit engaging manner. As illustrate in FIGS. 2 and 5, due to the formation of the slots 231 in each of the second wall portions 23, the flexible bars 233 of each of the second wall portions 23 are pushable in a transverse direction (X), which is transverse to the second wall portions 23, to flex so as to deflect the flexible legs 315 in the transverse direction (X), thereby disengaging the hooked ends 3151 from the slot-defining walls 2311 defining the slots 231 in the second wall portion 23, respectively, and thereby permitting detachment of the bridging member 3 from the middle housing 2.

The top end 261 of each of the first wall portions 26 is disposed above the top wall 311 of the middle part 31 of the bridging member 3. The uppermost edge portion 3213 of the U-shaped top edge 321 of each of the end parts 32 is in contact with the top end 261 of a respective one of the first wall portions 261. The pivot part 33 has a top end 332 that is substantially flush with the top ends 261 of the first wall portions 26.

During assembly, when the bridging member 3 is inserted into the accommodating recess 22 in the middle housing 2, the hooked ends 3151 come into contact with inner side surfaces of the second wall portions 23 so that the flexible legs 315 are flexed. Subsequently, when the hooked ends 3151 move past the slot-defining walls 2311, the flexible legs 315 restore their original shapes to engage the slot-defining walls 2311 with the hooked ends 3141, respectively. That is, the middle part 31 engages the middle frame segment 20 of the middle housing 2 in a snap-fit engaging manner.

FIGS. 6 to 9 illustrate the second preferred embodiment of the windshield wiper blade assembly according to the present invention. The second preferred embodiment differs from the previous embodiment mainly in that in this embodiment, one of the end parts 32 engages the middle frame segment 20 in a tongue-and-groove engaging manner, and the other of the end parts 32 engages the middle frame segment 20 in both tongue-and-groove and snap-fit engaging manners.

In this preferred embodiment, each of the second wall portions 23 is formed with one slot 231 and one flexible bar 233 disposed immediately above the slot 231. One of the first wall portions 261 is formed with a first engaging groove 262 disposed below the top end 261 of the first wall portion 261. The middle frame segment 20 has one wing 27 extending from the top end 261 of the other of the first wall portions 261 along the length of the middle housing 2. The wing 27 is formed with a second engaging groove 272 that is indented inwardly from a top surface of the wing 27. Each of the end parts 32 further has two opposite lateral walls 323 and a transverse wall 324 disposed between and interconnecting the lateral walls 323. The bridging member 3 further has a first engaging tongue 343 protruding from the transverse wall 324 of one of the end parts 32 into the first engaging groove 262, and a second engaging tongue 344 protruding from the transverse wall 324 of the other of the end parts 32 into the second engaging groove 272. Each of the lateral walls 323 has a bottom end 3231, and is formed with one flexible leg 325 that extends downwardly from the bottom end 3231 of the lateral wall 323 and that has a hooked end 3251 which extends into the slot 231 to engage releasably the slot-defining wall 2311 of a respective one of the second wall portions 23 of the recess-defining wall in a snap-fit engaging manner. The slot 231 is U-shaped. The first engaging groove 262 is defined by a wall having a close-looped cross section. The second engaging tongue 344 and the second engaging groove 272 are L-shaped.

FIGS. 10 to 14 illustrate the third preferred embodiment of the windshield wiper blade assembly according to the present invention. The third preferred embodiment differs from the previous embodiments mainly in that in this embodiment, the end parts 32 engage one of the second wall portions 23 of the middle frame segment 20 in a tongue-and-groove engaging manner, and the middle part 31 engages the other of the second wall portions 23 of the middle frame segment 20 in a snap-fit engaging manner.

Figure 8:
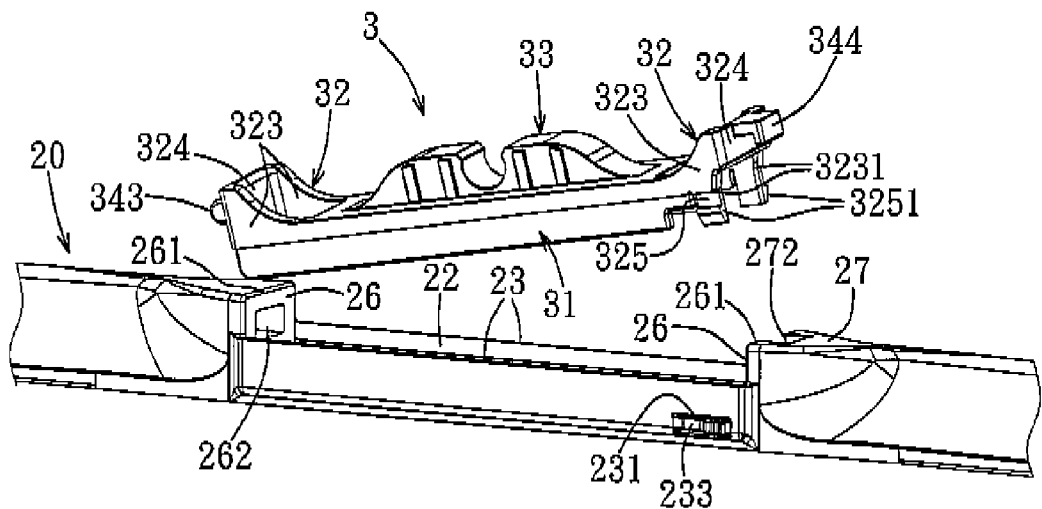
FIGS. 8 and 9 are fragmentary perspective views illustrating how a bridging member is mounted on the middle frame segment of the second preferred embodiment.
Figure 9:
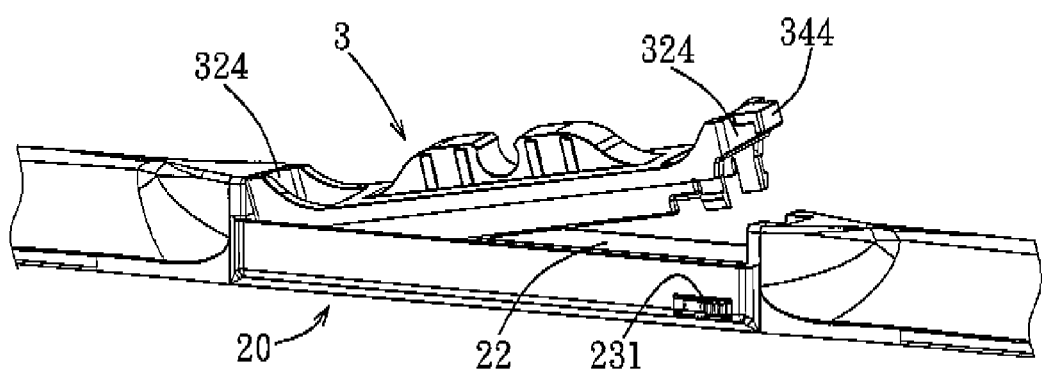
Figure 10:
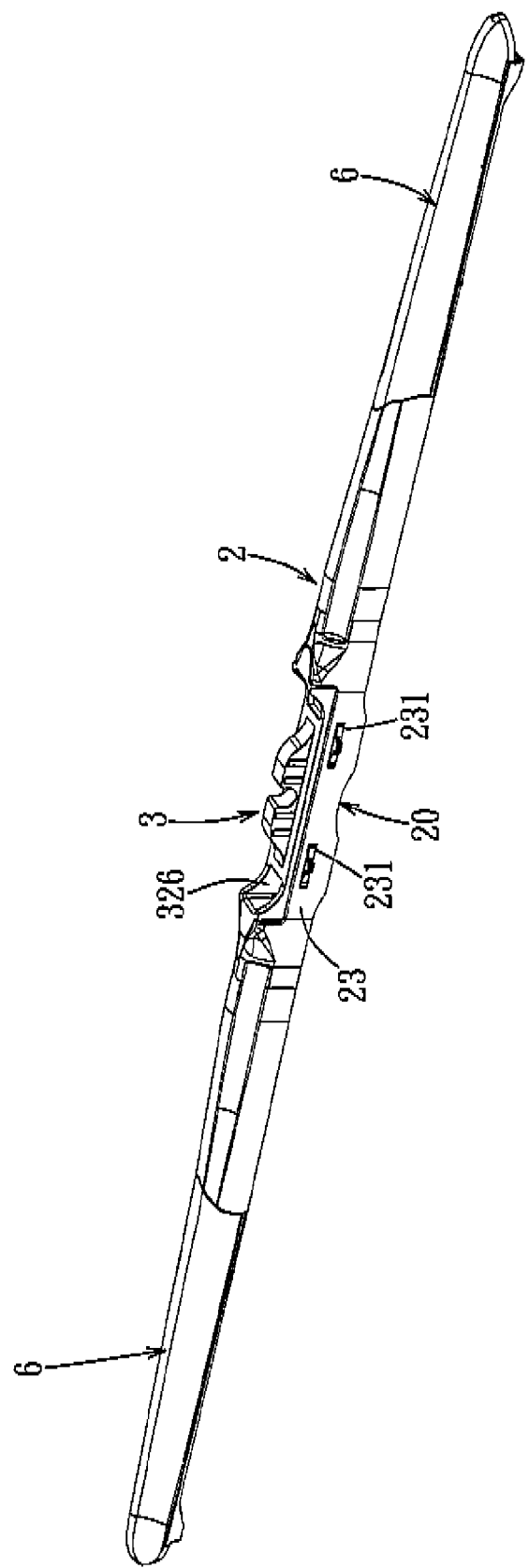
FIGS. 10 and 11 are respectively front and rear perspective views of the third preferred embodiment of a windshield wiper blade assembly according to the present invention.
Figure 11:
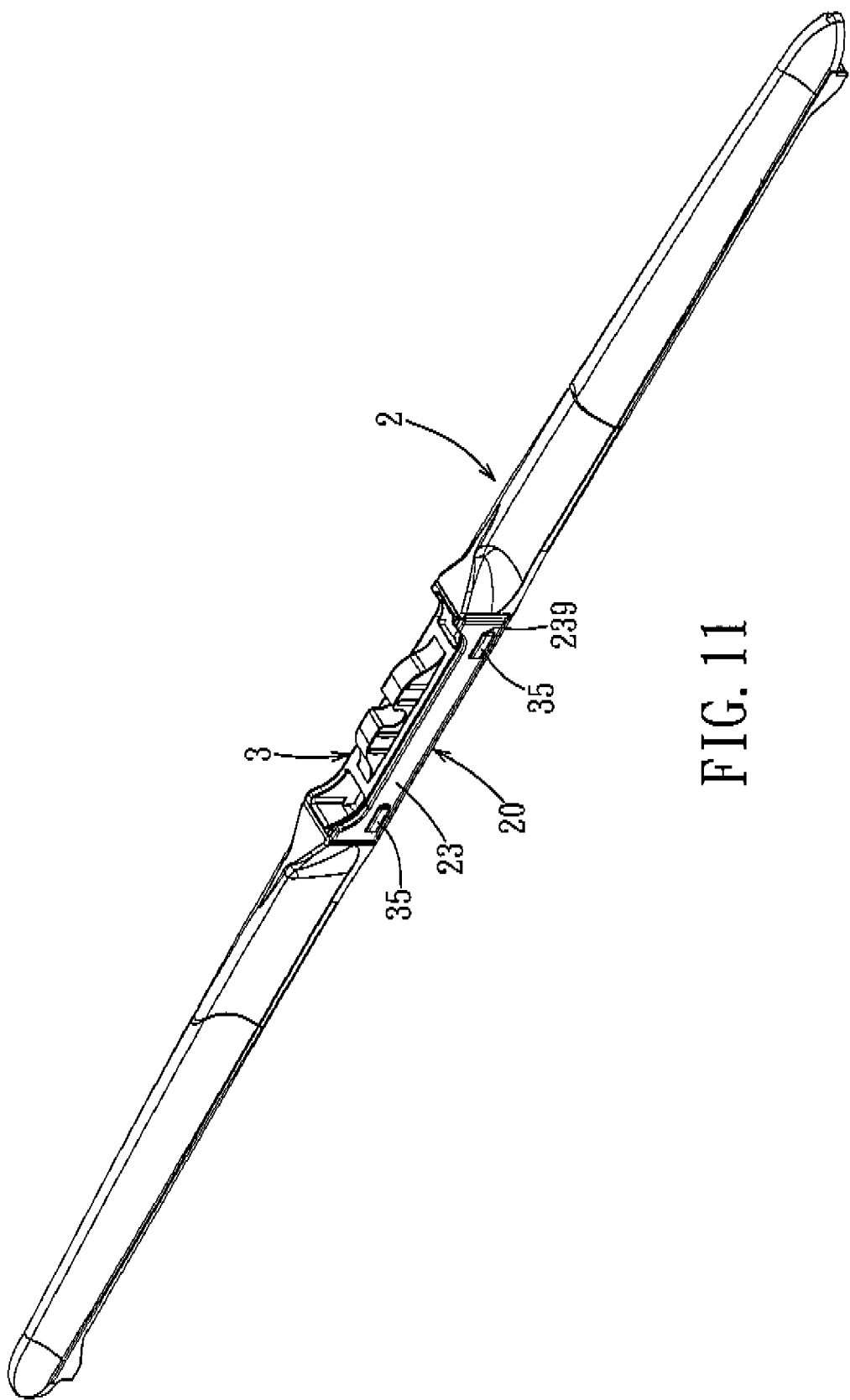
Figure 12:
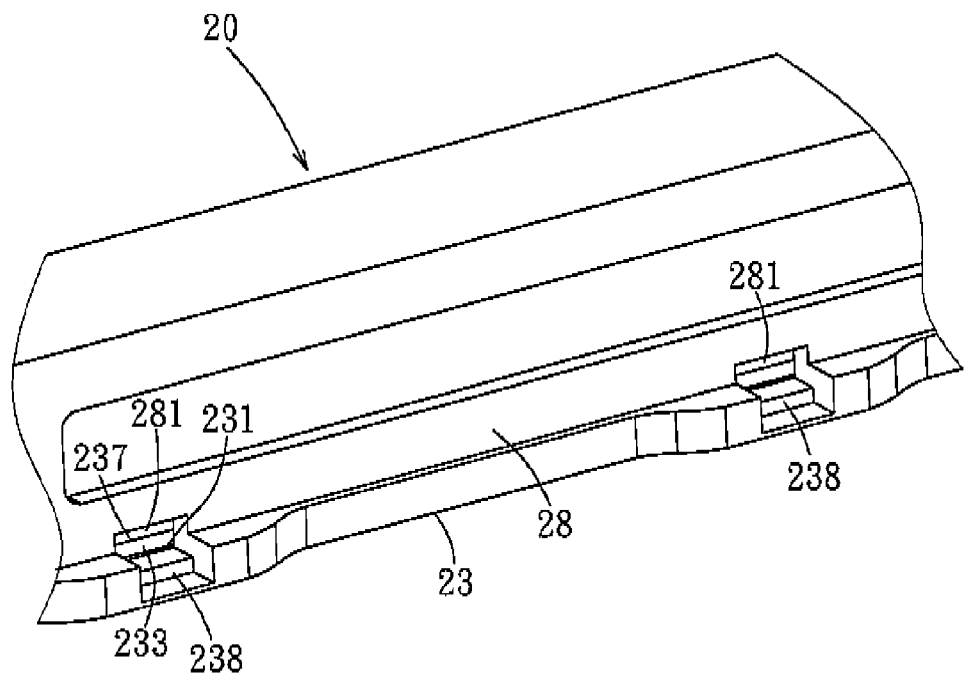
FIG. 12 is a fragmentary perspective view of a middle frame segment of a middle housing of the third preferred embodiment, viewing from a bottom side.
Figure 13:
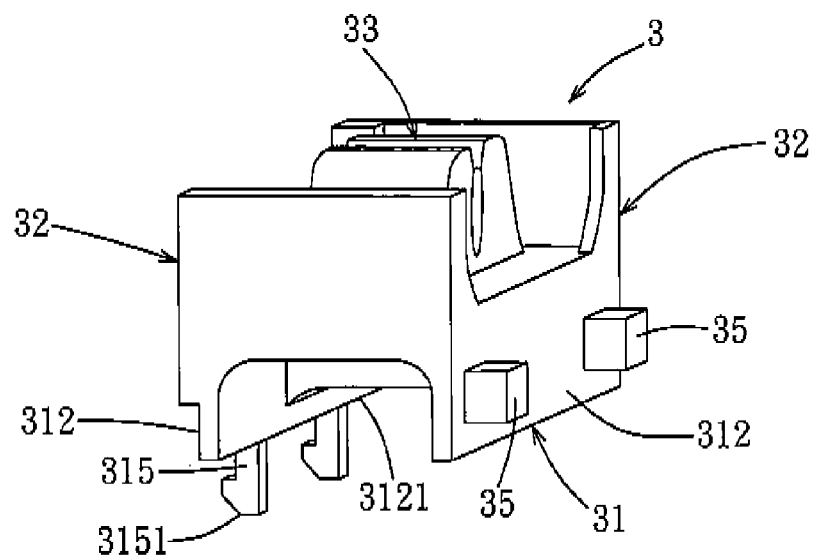
FIG. 13 is a perspective view of a bridging member of the third preferred embodiment.
Figure 14:
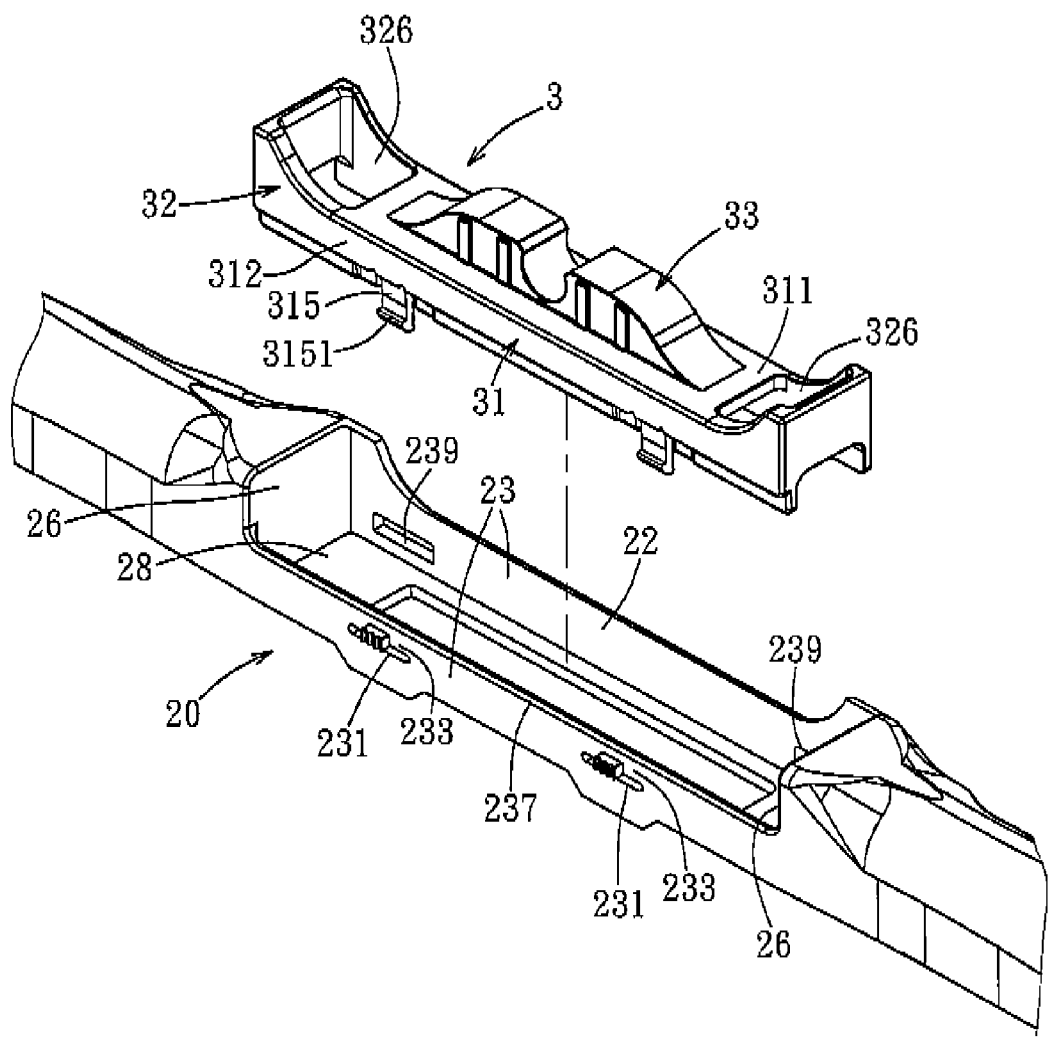
FIG. 14 is a fragmentary exploded perspective view of the third preferred embodiment.

In this preferred embodiment, the recess-defining wall defining the accommodating recess 22 further has a bottom wall portion 28 interconnecting and cooperating with the first and second wall portions 26, 23 (see FIG. 7) to define the accommodating recess 22 (see FIG. 8). One of the second wall portions 23 has a top end 237, and is formed with two slots 231 adjacent to the top end 237, and two flexible bars 233 disposed immediately above the slots 231, respectively. Said one of the second wall portions 23 is formed with two inner necks 238 disposed below the bottom wall portion 28. The bottom wall portion 28 is formed with two through-holes 281 disposed below the slots 231 and above the inner necks 238. The other of the second wall portions 23 is formed with two engaging grooves 239, and has a top end that is disposed above the top end 237 of said one of the second wall portions 23. One of the side walls 312 of the middle part 31 of the bridging member 3 is formed with two flexible legs 315 that extend downwardly from the bottom end 3121 of the side wall 312 of the middle part 31 through the through-holes 281 in the bottom wall portion 28 and that have hooked ends 3151 which engage bottom surfaces of the inner necks 238 in a snap-fit engaging manner, respectively. The bridging member 3 further has two engaging tongues 35 protruding from the end parts 32 of the bridging member 3 into the engaging grooves 239 in one of the second wall portions 23, respectively.

Figure 15:
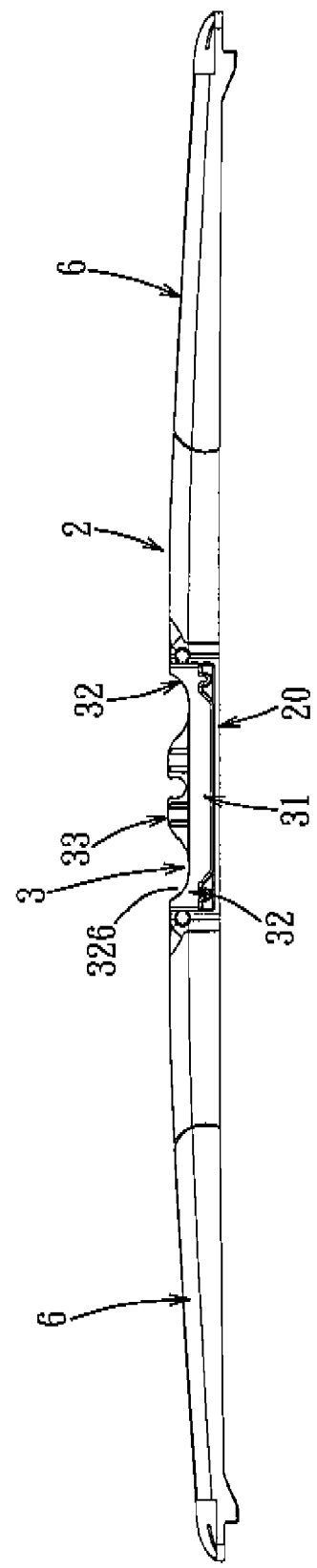
FIG. 15 is a perspective view of the fourth preferred embodiment of a windshield wiper blade assembly according to the present invention.
Figure 16:
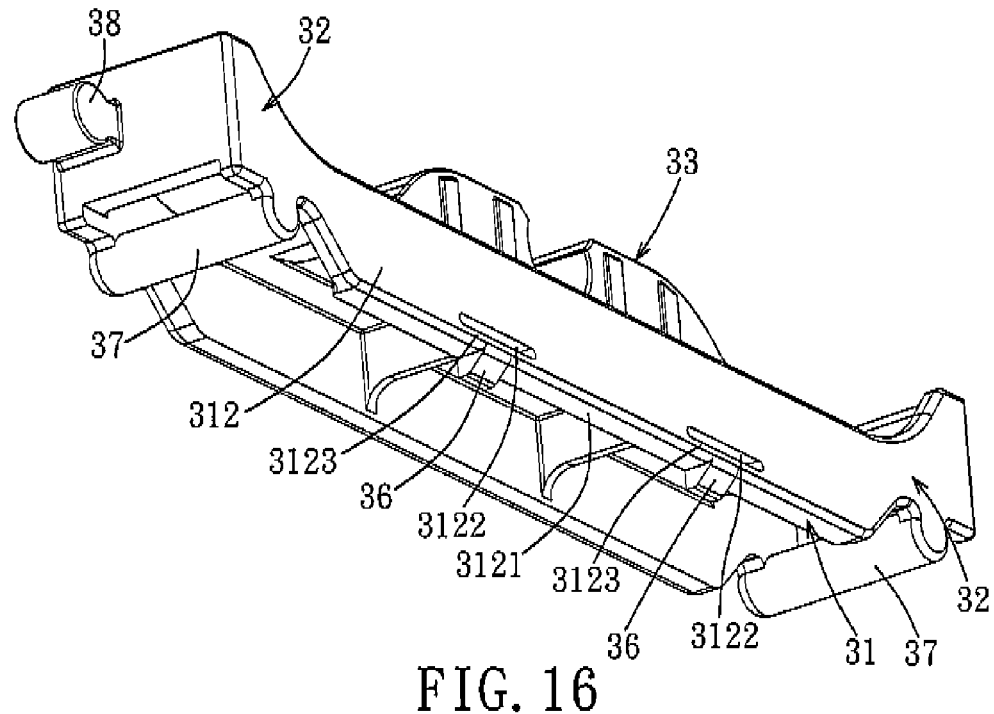
FIG. 16 is a perspective view of a bridging member of the fourth preferred embodiment.
Figure 17:
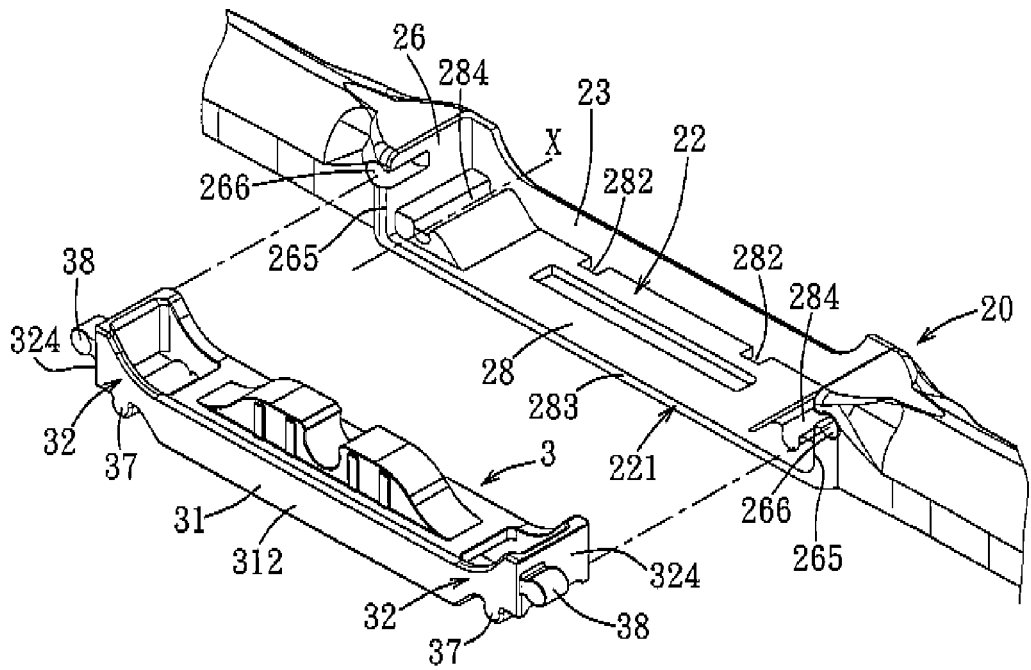
FIG. 17 is a fragmentary exploded perspective view of the fourth preferred embodiment.
Figure 18:
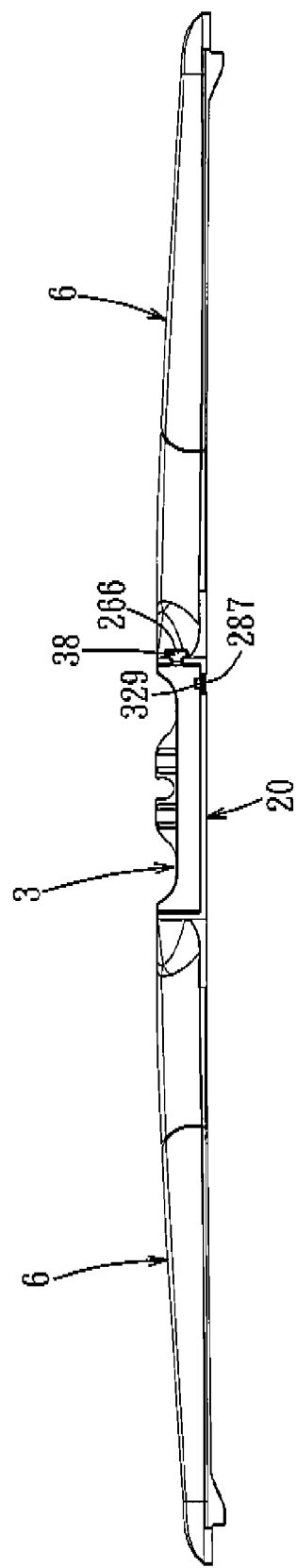
FIG. 18 is a perspective view of the fifth preferred embodiment of a windshield wiper blade assembly according to the present invention.
Figure 19:
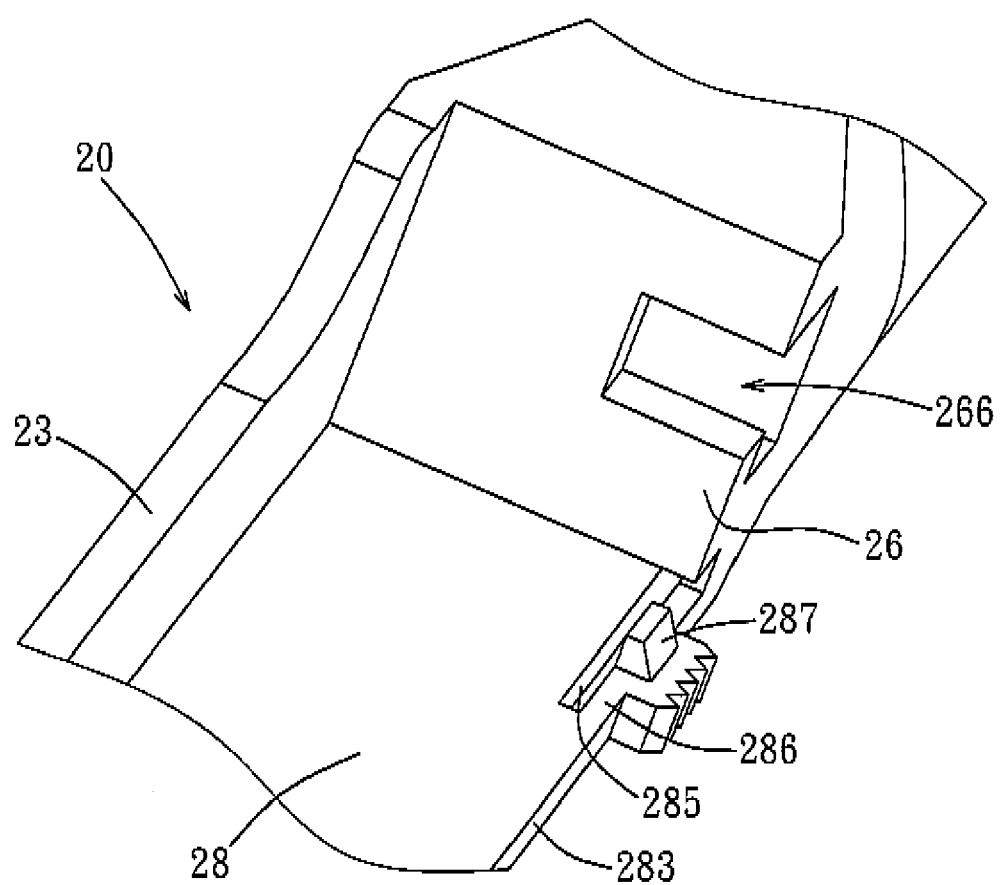
FIG. 19 is a fragmentary perspective view of a middle frame segment of a middle housing of the fifth preferred embodiment.
Figure 20:
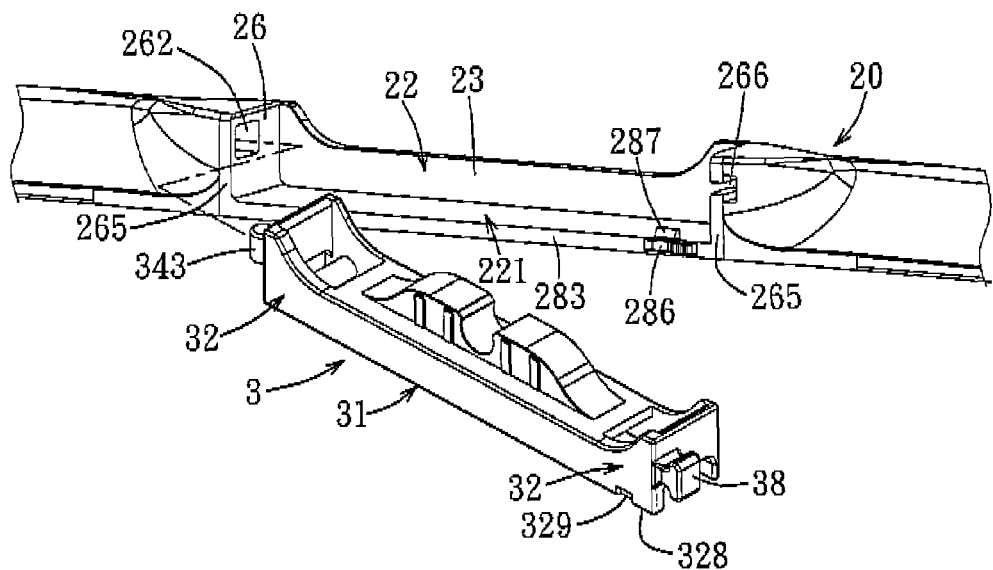
FIGS. 20 and 21 are fragmentary exploded perspective views of the fifth preferred embodiment illustrating how a bridging member is mounted on the middle frame segment of the middle housing.
Figure 21:
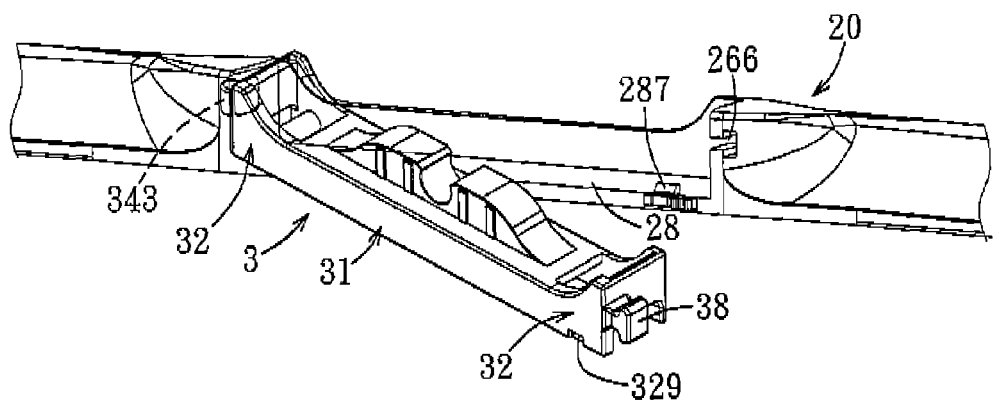

FIGS. 15 to 17 illustrate the fourth preferred embodiment of the windshield wiper blade assembly according to the present invention. The fourth preferred embodiment differs from the previous embodiments mainly in that in this embodiment, the end parts 32 engage respectively the first wall portions 26 of the middle frame segment 20 in a tongue-and-groove engaging manner, and the middle part 31 engages one of the second wall portions 23 of the middle frame segment 20 in a snap-fit engaging manner.

In this preferred embodiment, the recess-defining wall defining the accommodating recess 22 of the middle frame segment 20 has one second wall portion 23 disposed between and interconnecting the first wall portions 26 and a bottom wall portion 28 interconnecting and cooperating with the first wall portions 26 and the second wall portion 23 to define the accommodating recess 22. The bottom wall portion 28 is formed with two notches 282. One of the side walls 312 of the middle part 31 of the bridging member 3 has a bottom end 3121, and is formed with two slots 3122 adjacent to the bottom end 3121 of the side wall 312 of the middle part 31 and two flexible bars 3123 disposed below the slots 3122. The bridging member 3 further has two tapered studs 36 protruding downwardly from the flexible bars 3123 into the notches 282 in a snap-fit engaging manner, respectively. The flexible bars 3123 are pushable to flex so as to permit the tapered studs 36 to deflect to engage or disengage the notches 282. Each of the first wall portions 26 and the bottom wall portion 28 has a front side 265, 283 opposite to the second wall portion 23. The front sides 265, 283 of the first wall portions 26 and the bottom wall portion 28 cooperatively define a U-shaped front side opening 221 for insertion of the bridging member 3 therethrough and into the middle frame segment 20 and for removal of bridging member 3 therethrough from the middle frame segment 20. The bottom wall portion 28 of the recess-defining wall is further formed with two first engaging grooves 284 disposed above the notches 282 and extending in the transverse direction (X) transverse to the second wall portion 23. Each of the first wall portions 26 is formed with a second engaging groove 266 extending rearwardly from the front side 265 of the first wall portion 26 in the transverse direction (X) and disposed above the first engaging groove 284. Each of the first and second engaging grooves 284, 266 is defined by a wall having a C-shaped cross section. The bridging member 3 further has two first engaging tongues 37 protruding from bottom ends of the end parts 32 of the bridging member and fitted into the first engaging grooves 284, respectively, and two second engaging tongues 38 protruding from the transverse walls 324 of the end parts 32 and fitted into the second engaging grooves 266, respectively.

FIGS. 18 to 21 illustrate the fifth preferred embodiment of the windshield wiper blade assembly according to the present invention. The fifth preferred embodiment differs from the previous embodiments mainly in that in this embodiment, one of the end parts 32 engages one of the first wall portions 26 of the middle frame segment 20 in a tongue-and-groove engaging manner, and the other of the end parts 32 engages the other of the first wall portions 26 in a tongue-and-groove engaging manner and further engages the middle frame segment 20 in a snap-fit engaging manner.

In this preferred embodiment, the recess-defining wall defining the accommodating recess 22 has one second wall portion 23 disposed between and interconnecting the first wall portions 26, and a bottom wall portion 28 interconnecting and cooperating with the first wall portions 26 and the second wall portion 23 to define the accommodating recess 22. The bottom wall portion 28 has a front side 283 opposite to the second wall portion 23, and is formed with a slot 285 adjacent to the front side 283 and a flexible bar 286 disposed in front of the slot 285. One of the end parts 32 of the bridging member 3 has a bottom end 328 and is formed with a bottom recess 329 extending upwardly from the bottom end 328 of the end part 32. The bottom wall portion 28 of the recess-defining wall defining the accommodating recess 22 is further formed with a tapered stud 287 protruding upwardly from the flexible bar 286 and fitted into the bottom recess 329 in a snap-fit engaging manner. The flexible bar 286 is pushable to flex so as to permit the tapered stud 287 to deflect to thereby engage or disengage the bottom recess 329. Each of the first wall portions 26 has a front side 265 opposite to the second wall portion 23. The front sides 265, 283 of the first wall portions 26 and the bottom wall portion 28 cooperatively define a O-shaped front side opening 221. One of the first wall portions 26 is formed with a first engaging groove 262. The other of the first wall portions 26 is formed with a second engaging groove 266 extending rearwardly from the front side 265 of the first wall portion 26 in the transverse direction (X) transverse to the second wall portion 23. The first engaging groove 262 is defined by a wall having a close-looped cross section. The second engaging groove 266 is defined by a wall having a C-shaped cross section. The bridging member 3 further has a first engaging tongue 343 protruding from one of the end parts 32 of the bridging member 3 and fitted into the first engaging groove 262, and a second engaging tongue 38 protruding from the other of the end parts 32 and fitted into the second engaging groove 266.

By forming the accommodating recess 22 in the middle frame segment 20 for receiving the bridging member 3 and the structures of the middle frame segment 20 and the bridging member 3 of the windshield wiper blade assembly of this invention, the purposes of meeting the foresaid needs of reducing the height of the assembly of the blade support and the bridging member and of easy assembly and disassembly of the bridging member and the blade support can be achieved.

With the invention thus explained, it is apparent that various modifications and variations can be made without departing from the spirit of the present invention.

What is claimed is:

1. A windshield wiper blade assembly adapted to be connected to a wiper arm connector having a pivot shaft, said windshield wiper blade assembly comprising:

an elongate middle housing having a middle frame segment that defines an accommodating recess;

an elastic wiper blade having a top end secured to a bottom side of said middle housing; and a bridging member fitted in said accommodating recess, said bridging member having two end parts, a middle part disposed between and interconnecting said end parts, and a pivot part, said middle part having a top wall and two opposite side walls extending downwardly and respectively from two opposite sides of said top wall into said accommodating recess, said pivot part protruding upwardly from said top wall of said middle part and defining a shaft-receiving recess for extension of the pivot shaft of the wiper arm connector therein, each of said end parts having a top edge extending upwardly and outwardly from an adjacent end of said top wall of said middle part so as to cooperate with said pivot part to define an extension recess therebetween for extension of an adjacent one of two ends of the wiper arm connector therein during swinging of the wiper arm connector about an axis of the pivot shaft, at least one of said end parts engaging said middle frame segment of said middle housing in a tongue-and-groove engaging manner and at least one of said end parts and said middle part engaging said middle frame segment of said middle housing in a snap-fit engaging manner.

2. The windshield wiper blade assembly of claim 1, wherein said accommodating recess is defined by a recess-defining wall that has two first wall portions, said first wall portions being spaced apart from and opposite to each other along a length of said middle housing, each of said first wall portions having a top end disposed above said top wall of said middle part of said bridging member.

3. The windshield wiper blade assembly of claim 2, wherein said top edge of each of said end parts is generally U-shaped, has an uppermost edge portion, and a curved intermediate edge portion extending upwardly and outwardly from said adjacent end of said top wall of said middle part to said uppermost edge portion.

4. The windshield wiper blade assembly of claim 3, wherein said uppermost edge portion of said top edge of each of said end parts is in contact with said top end of a respective one of said first wall portions.

5. The windshield wiper blade assembly of claim 4, wherein said pivot part has a top end that is substantially flush with said top ends of said first wall portions.

6. The windshield wiper blade assembly of claim 3, wherein said middle frame segment has two opposite first wings extending respectively from said top ends of said first wall portions along the length of said middle housing in opposite directions, each of said first wings being formed with an engaging groove, said bridging member further having two opposite second wings extending respectively from said top edges of said end parts, each of said second wings being formed with an engaging tongue fitted into said engaging groove in a respective one of said first wings.

7. The windshield wiper blade assembly of claim 2, wherein said recess-defining wall further has two opposite second wall portions disposed between and interconnecting said first wall portions, each of said second wall portions having a bottom end and being formed with at least one slot adjacent to said bottom end of said second wall portion and at least one flexible bar disposed immediately under said slot, said slot having a top side that is defined by a slot-defining wall, each of said side walls of said middle part of said bridging member having a bottom end and being formed with at least one flexible leg that extends downwardly from said bottom end of said side wall of said middle part and that has a hooked end which extends into said slot to engage releasably said slot-defining wall of a respective one of said second wall portions of said recess-defining wall in a snap-fit engaging manner, said flexible bar being pushable in a transverse direction, which is transverse to said second wall portion, to flex so as to deflect said flexible leg in the transverse direction, thereby disengaging said hooked end from said slot-defining wall.

8. The windshield wiper blade assembly of claim 2, wherein said recess-defining wall further has two opposite second wall portions disposed between and interconnecting said first wall portions, each of said second wall portions having a bottom end and being formed with a slot adjacent to said bottom end, and a flexible bar disposed immediately under said slot, said slot having a top side that is defined by a slot-defining wall, one of said first wall portions being formed with a first engaging groove, said middle frame segment having a wing extending from said top end of the other of said first wall portions along the length of said middle housing, said wing being formed with a second engaging groove, each of said end parts further having two opposite lateral walls and a transverse wall disposed between and interconnecting said lateral walls, said bridging member further having a first engaging tongue protruding from said transverse wall of one of said end parts into said first engaging groove, and a second engaging tongue protruding from said transverse wall of the other of said end parts into said second engaging groove, each of said lateral walls having a bottom end and being formed with a flexible leg that extends downwardly from said bottom end of said lateral wall and that has a hooked end which extends into said slot to engage releasably said slot-defining wall of a respective one of said second wall portions of said recess-defining wall in a snap-fit engaging manner, said flexible bar being pushable in a transverse direction, which is transverse to said second wall portion, to flex so as to deflect said flexible leg in the transverse direction, thereby disengaging said hooked end from said slot-defining wall.

9. The windshield wiper blade assembly of claim 2, wherein said recess-defining wall further has two opposite second wall portions disposed between and interconnecting said first wall portions, and a bottom wall portion interconnecting and cooperating with said first and second wall portions to define said accommodating recess, one of said second wall portions having a top end and being formed with at least one slot adjacent to said top end of said second wall portion and at least one flexible bar disposed immediately above said slot, said one of said second wall portions being formed with an inner neck disposed below said bottom wall portion and having a bottom surface, said bottom wall portion being formed with at least one through-hole disposed below said slot and above said inner neck, the other of said second wall portions being formed with at least one engaging groove that is disposed above said top end of said one of said second wall portions, one of said side walls of said middle part of said bridging member having a bottom end and being formed with at least one flexible leg that extends downwardly from said bottom end of said side wall of said middle part through said through-hole in said bottom wall portion and that has a hooked end which engages said bottom surface of said inner neck in a snap-fit engaging manner, said flexible bar being pushable in a transverse direction, which is transverse to said second wall portion, to flex so as to deflect said flexible leg in the transverse direction, thereby disengaging said hooked end from said inner neck, said bridging member further having at least one engaging tongue protruding from one of said end parts of said bridging member into said engaging groove.

10. The windshield wiper blade assembly of claim 2, wherein said recess-defining wall further has a second wall portion disposed between and interconnecting said first wall portions, and a bottom wall portion interconnecting and cooperating with said first and second wall portions to define said accommodating recess, said bottom wall portion being formed with at least an notch, one of said side walls of said middle part of said bridging member having a bottom end and being formed with at least one slot adjacent to said bottom end of said side wall of said middle part and at least one flexible bar disposed immediately under said slot, said bridging member further having a tapered stud protruding downwardly from said flexible bar into said notch in a snap-fit engaging manner, said flexible bar being pushable to flex so as to permit said tapered stud to deflect in a manner to engage or disengage said notch, each of said first wall portions and said bottom wall portion having a front side opposite to said second wall portion, said front sides of said first wall portions and said bottom wall portion cooperatively defining a U-shaped front side opening, said bottom wall portion of said recess-defining wall being further formed with at least one first engaging groove disposed above said notch and extending in a transverse direction transverse to said second wall portion, one of said first wall portions being formed with a second engaging groove extending rearwardly from said front side of said first wall portion in the transverse direction and disposed above said first engaging groove, each of said first and second engaging grooves being defined by a wall having a C-shaped cross section, said bridging member further having at least one first engaging tongue protruding from one of said end parts of said bridging member and fitted into said first engaging groove, and at least one second engaging tongue protruding from the other of said end parts and fitted into said second engaging groove.

11. The windshield wiper blade assembly of claim 2, wherein said recess-defining wall further has a second wall portion disposed between and interconnecting said first wall portions, and a bottom wall portion interconnecting and cooperating with said first and second wall portions to define the accommodating recess, said bottom wall portion having a front side opposite to said second wall portion and being formed with a slot adjacent to said front side and a flexible bar disposed in front of said slot, one of said end parts of said bridging member having a bottom end and being formed with a bottom recess extending upwardly from said bottom end of said end part, said bottom wall portion being further formed with a tapered stud protruding upwardly from said flexible bar and fitted into said bottom recess in a snap-fit engaging manner, said flexible bar being pushable to flex so as to permit said tapered stud to deflect in a manner to engage or disengage said bottom recess, each of said first wall portions having a front side opposite to said second wall portion, said front sides of said first wall portions and said bottom wall portion defining a U-shaped front side opening, one of said first wall portions being formed with a first engaging groove, the other of said first wall portions being formed with a second engaging groove extending rearwardly from said front side of said first wall portion in a transverse direction transverse to said second wall portion, said first engaging groove being defined by a wall having a close-looped cross section, said second engaging groove being defined by a wall having a C-shaped cross section, said bridging member further having at least one first engaging tongue protruding from one of said end parts of said bridging member and fitted into said first engaging groove, and at least one second engaging tongue protruding from the other of said end parts and fitted into said second engaging groove.

\* \* \* \* \*